United States Patent [19]

Clark et al.

[11] Patent Number: 5,621,305

[45] Date of Patent: Apr. 15, 1997

[54] OVERLOAD MANAGEMENT SYSTEM

[75] Inventors: Kara Clark, Schenectady; Einar V. Larsen, Charlton; Carl A. Wegner, Clifton Park; Richard J. Piwko, Rexford, all of N.Y.; J. Kenneth Hooker, Vinton, Va.

[73] Assignee: Electric Power Research Institute, Inc., Palo Alto, Calif.

[21] Appl. No.: 82,408

[22] Filed: Jun. 23, 1993

Related U.S. Application Data

[63] Continuation-in-part of Ser. No. 48,132, Apr. 13, 1993, which is a continuation-in-part of Ser. No. 806,768, Dec. 13, 1991, Pat. No. 5,202,583.

[51] Int. Cl.$^6$ ........................................................ G05F 1/00
[52] U.S. Cl. ........................................ 323/210; 307/102
[58] Field of Search ........................................ 323/205, 206, 323/208, 209, 210, 211, 271, 356, 370; 307/102, 105; 322/58; 361/58, 107

[56] References Cited

U.S. PATENT DOCUMENTS

| | | | |
|---|---|---|---|
| 3,703,680 | 11/1972 | Frank et al. | 323/210 |
| 4,188,573 | 2/1980 | Gyugyi et al. | 323/210 |
| 4,292,545 | 9/1981 | Hingorani | 323/210 |
| 4,302,715 | 11/1981 | Putman et al. | 323/210 |
| 4,307,331 | 12/1981 | Gyugyi | 323/210 |
| 4,311,253 | 1/1982 | Putman et al. | 322/58 |
| 4,355,241 | 10/1982 | Hingorani | 307/102 |
| 4,434,376 | 2/1984 | Hingorani | 323/210 |
| 4,438,386 | 3/1984 | Gyugyi | 323/210 |
| 4,451,777 | 5/1984 | Gyugyi | 323/210 |
| 4,513,240 | 4/1985 | Putman | 323/210 |
| 4,567,423 | 1/1986 | Dobsa et al. | 323/215 |
| 4,607,217 | 8/1986 | Bhargava | 323/210 |
| 4,719,402 | 1/1988 | Brennen et al. | 323/211 |
| 4,724,333 | 2/1988 | Hedin | 307/102 |
| 4,808,843 | 2/1989 | Hedin | 307/102 |
| 4,811,236 | 3/1989 | Brennan et al. | 323/210 |
| 4,843,513 | 6/1989 | Edris | 307/102 |
| 4,999,565 | 3/1991 | Nilsson | 323/210 |
| 5,032,738 | 7/1991 | Vithayathil | 323/211 |
| 5,121,048 | 6/1992 | Anderson | 330/295 |

OTHER PUBLICATIONS

Keri, et al., "Improving Transmission System Performance Using Controlled Series Capacitors," CIGRE paper 14/37/38-07, Paris, 1992.
Christl, et al., "Advanced Series Compensation (ACS) with Thyristor Controlled Impedance," CIGRE paper 14/37/38-05, Paris, 1992.
Urbanek, et al., "Thyristor Controlled Series Compensation Prototype Installation at the Slatt 500 KV Substation," IEEE PES Paper 92-SM-467-1PWRD, Seattle, Jul. 1992.
Larsen, et al., "Thyristor Controlled Series Compensation—Control Design and Dynamic Performance," EPRI FACTS Conference, Boston, May 1992.
IEEE Standard for Series Capacitors in Power Systems, IEEE Std 824-1985, Nov. 25, 1985.
IEEE Guide for Loading Mineral-Oil-Immersed Power Transformers Up to and Including 100 MVA, ANSI/IEEE C57.92-1981, p. 66.

*Primary Examiner*—Jeffrey A. Gaffin
*Assistant Examiner*—Peter Ganjoo
*Attorney, Agent, or Firm*—Flehr, Hohbach, Test, Albritton & Herbert

[57] ABSTRACT

An overload management system is provided, including a method and an apparatus, for controlling the operation of electrical equipment in a short-term overload region above the equipment's continuous capability operation curve, without suffering significant loss of equipment life. This overload management system is particularly beneficial for use with equipment having load management capability, such as a modular thyristor controlled series capacitor (TCSC) system using phase controlled firing based on monitored capacitor voltage and line current. For vernier operation, the system predicts an upcoming firing angle for switching a switching device to govern the current received by the electrical device, such as to bypass line current around a series capacitor of the TCSC system. The overload management system may serve as one of several higher-level controllers providing input to a vernier controller for accommodating competing objectives of various system demands.

18 Claims, 8 Drawing Sheets

OVERLOAD MANAGEMENT SYSTEM

This is a continuation-in-part application of the U.S. application Ser. No. 08/048,132, filed on Apr. 13, 1993, which is a continuation-in-part application of the U.S. application Ser. No. 07/806,768, filed on Dec. 13, 1991, issued as U.S. Pat. No. 5,202,583 on Apr. 13, 1993, which all have at least one co-inventor in common.

BACKGROUND OF THE INVENTION

The present invention relates generally to an overload management system, including a method and an apparatus, for controlling the operation of electrical equipment in a short-term overload region above the equipment's continuous capability operation curve, without suffering significant loss of equipment life. This overload management system is particularly beneficial for use with equipment having load management capability, including thyristor-controlled power equipment, such as high voltage direct current (HVDC) equipment, motor drives, static volt-ampere-reactive (VAR) compensators (SVC), and thyristor-controlled series compensation (TCSC) systems.

The present invention may be used in combination with a modular order distribution logic firing control system, which accommodates the competing objectives of various system demands in an alternating current (AC) power distribution system. These system demands may include minimizing losses in scheduling control, stabilizing transients, damping subsynchronous resonance (SSR) oscillations, damping direct current (DC) offset, and damping power-swings, as well as more efficiently using the overload capability of electrical equipment in accordance with the present invention.

Power equipment is typically rated in terms of continuous capability limits and short-term overload capability limits. The cost of a particular installation may be minimized by designing the equipment for normal operating conditions, and then using an operational philosophy which intentionally uses this inherent overload capability of the equipment. For example, a TCSC system may be designed for normal line current, even though the line current may exceed the steady-state rating for short durations for a limited number of times over the life span of the TCSC equipment.

One common overload index used by designers specifying equipment is the thirty minute rating. The equipment may be operated during a rare overload event in the thirty minute rating region, for instance, while system operators redispatch power flows over the power system. Another commonly used index is the transient rating region, for instance, on the order of a ten second overload rating. The equipment may be operated in the transient rating region after a major contingency, such as a fault, to delay bypassing operations until the system stabilizes.

For instance, typical TCSC systems are designed with the intent that occasionally the inherent short-term overload capability of the capacitor will be used. However, the recently realized ability of a TCSC system to amplify the current through the capacitor using vernier conduction adds significantly to the complexity of the TCSC system, in comparison with a conventional series capacitor system. Such vernier operation of a TCSC system is shown in the related U.S. Pat. No. 5,202,538, to Larsen et al., referenced in the first paragraph above. Thus, any attempt to operate such a vernier controlled TCSC system must also address this current amplification characteristic.

Other controlled series compensation systems have been proposed, but without including any type of an overload management function. For example, such earlier systems are proposed by N. Christl, et al. in the paper entitled "Advanced Series Compensation (ASC) With Thyristor-Controlled Impedance," CIGRE Paper No. 14/37/38-05 (Paris, 1992); and by A. J. F. Keri, et al., in the article entitled "Improving Transmission System Performance Using Controlled Series Capacitors," CIGRE Paper No. 14/37/38-07 (Paris, 1992).

In the past, other overload management systems have been proposed. For example, one primitive overload management system has been used with HVDC equipment. During serious power system disturbances, this earlier management system operates the HVDC system above its continuous rating for a specified length of time. After this overload operation, the HVDC system may return to a normal rate of operation or, in some cases shutdown is required for a specified recovery period. Unfortunately, during this recovery shutdown period, power must be rerouted around the HVDC equipment. Also, this earlier management system is implemented as a discrete function, with step-wise control. Thus, this earlier system is not capable of tailoring its response to match levels of overload operation required to accurately respond to fluctuating system disturbances.

Indeed, earlier strategies for handling equipment overloads in general have allowed cyclic operation between normal and overload conditions with discrete, step-wise transitions between conditions, and with durations for specific time periods. For example, overload operation at 137% may be allowed for two hours during a 24-hour cycle. This daily cycle is referred to in industry standards as an "assumed load cycle," with equipment designed to withstand certain temperature rises during such normal and overload conditions. These conventional operating strategies are illustrated in various equipment standards, such as those for power transformers.

Thus, a need exists for an improved overload management system for efficiently operating electrical devices in their short term overload regions, which is directed toward overcoming, and not susceptible to, the above limitations and disadvantages.

SUMMARY OF THE INVENTION

The illustrated embodiment of the present invention is particularly suitable for equipment that has the ability to manage or govern its own loading, rather than equipment which merely has a loading imposed upon it. For example, conventional series capacitors are incapable of exercising any type of management or control over their loading. In contrast, a TCSC system has load control capability, and is particularly well suited for operation with the overload management system of the present invention. Other types of controllable power equipment, referred to generally herein as electrical or power devices, may also be used with the overload management system of the present invention. Thyristors or other types of controllable switching devices, such as gate turnoff thyristors (GTOs), metal oxide field effect transistors (MOSFETs), insulated gate bipolar transistors (IGBTs), and the like, operate in response to the overload management system to control the loading of the power devices.

One embodiment of the overload management system is illustrated with respect to a TCSC system, which is the first implementation developed by the inventors. It is apparent to those skilled in the art that the principles and operation of the illustrated overload management system may be equally applied to various other controllable electrical devices, such as high voltage direct current (HVDC) equipment, static VAR compensators (SVC), various motors, drive systems, and the like.

According to one aspect of the present invention, an overload management system is provided for managing overload operation of an electrical device having short-term overload and continuous capability regions of operation. The electrical device has a switching device responsive to a control signal for governing the current received by the electrical device. The system has a sensor for monitoring a parameter representative of the operational state of the electrical device. In response to the monitoring, a controller determines the operational state, compares it with operating limits for the determined state, and issues the control signal to the switching device.

According to another aspect of the present invention, a method is provided for managing overload operation of an electrical device having short-term overload and continuous capability regions of operation.

According to a further aspect of the present invention, a method is provided for vernier operation of an electrical device responsive to a variety of input criteria, including managing overload operation of the device.

An overall object of the present invention is to provide an overload management system for power devices with load-governing capability which efficiently allows operation in the short-term overload region above the device's continuous capability curve, without the power devices incurring significant loss of life.

A further object of the present invention is to provide an improved method of managing such overload operation, and an improved overload management system which may be used to implement this method.

Yet another object of the present invention is to provide an overload management system which is faster operating, and more economical, in terms of both initial installation and operational costs, than earlier systems.

The present invention relates the above features and objects individually as well as collectively. These and other objects, features and advantages of the present invention will become apparent to those skilled in the art from the following description and drawings.

DETAILED DESCRIPTION OF A PREFERRED EMBODIMENT

Figure 1:
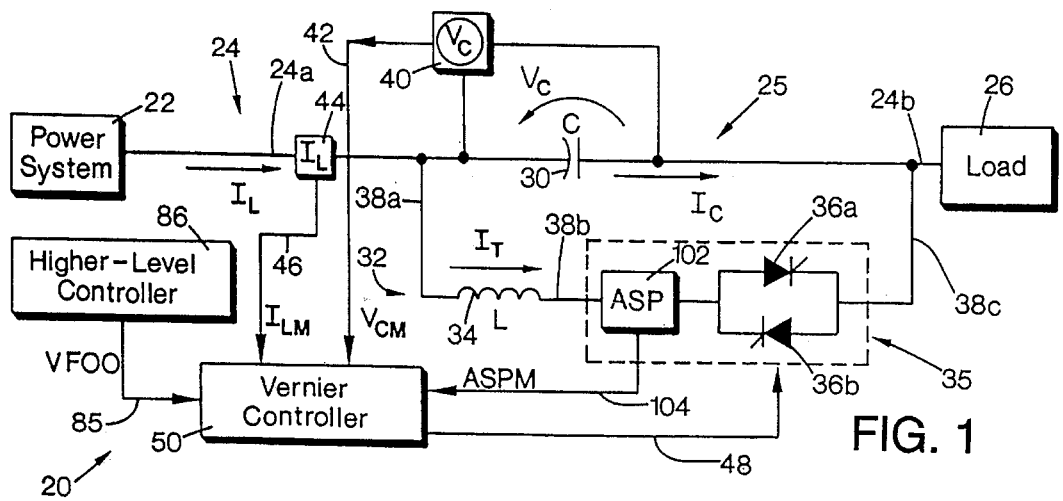
FIG. 1 is a single line schematic diagram of one form of a single-module thyristor controlled series capacitor (TCSC) system of the present invention, shown in series with a transmission line.

FIG. 1 illustrates an embodiment of a thyristor controlled series capacitor (TCSC) system 20 constructed in accordance with the present invention for damping undesirable subsynchronous oscillations and undesirable DC offset occurring in a power system or grid 22. The power system 22 has a transmission line 24 with segments 24a and 24b coupling a single module 25 of the TCSC system 20 in series with the power system 22 and with a load 26, respectively. A line current $I_L$ represents the direction of power flow from the power system 22 to the load 26.

The module 25 has a capacitor ("C") 30 in series with transmission line 24 and an inductive commutating circuit 32 in parallel with the capacitor 30. The capacitor 30 may be a plurality of discrete transistors joined as a capacitor bank having a known capacitive reactance $X_C$. The commutating circuit 32 includes an inductive component, such as an inductor ("L") 34, and a thyristor switch or valve 35 in series with the inductor 34. The thyristor valve 35 has two anti-parallel diodes 36a and 36b, hereinafter referred to collectively as thyristors 36 unless otherwise noted. The commutating circuit 32 has conductor segments 38a, 38b and 38c coupling the inductor 34 and thyristor valve 35 with the capacitor 30 and transmission line 24 as shown. In FIG. 1 the following variables are shown: $I_L$ for the line current through transmission line 24, $V_C$ for the actual voltage across capacitor 30, $I_C$ for the current through capacitor 30, and $I_T$ for the bypass thyristor current pulse flowing through the inductor 34 and the thyristor valve 35.

The module 25 includes a voltage monitor or sensor, such as a voltmeter 40, monitoring the voltage across the series capacitor 30. The voltage sensor 40 produces a measured capacitor voltage $V_{CM}$ signal 42 in response to the monitored actual capacitor voltage $V_C$. The TCSC system 20 has a line current monitor or sensor, such as an ammeter 44, monitors the line current $I_L$ flowing through the transmission line segment 24a. The line current sensor 44 produces a measured line current $I_{LM}$ signal 46 in response to the monitored line current $I_L$. The capacitor voltage $V_{CM}$ and line current $I_{LM}$ are preferably measured each half cycle.

The commutating circuit 32 conducts a thyristor current pulse therethrough when the bypass thyristor switch 35 fires to enter a conducting state in response to a firing command or firing pulse signal 48. This firing, preferably ahead of a capacitor voltage zero-crossing, produces an alternating offset voltage component across the series capacitor 30.

Vernier Controller

Figure 2:
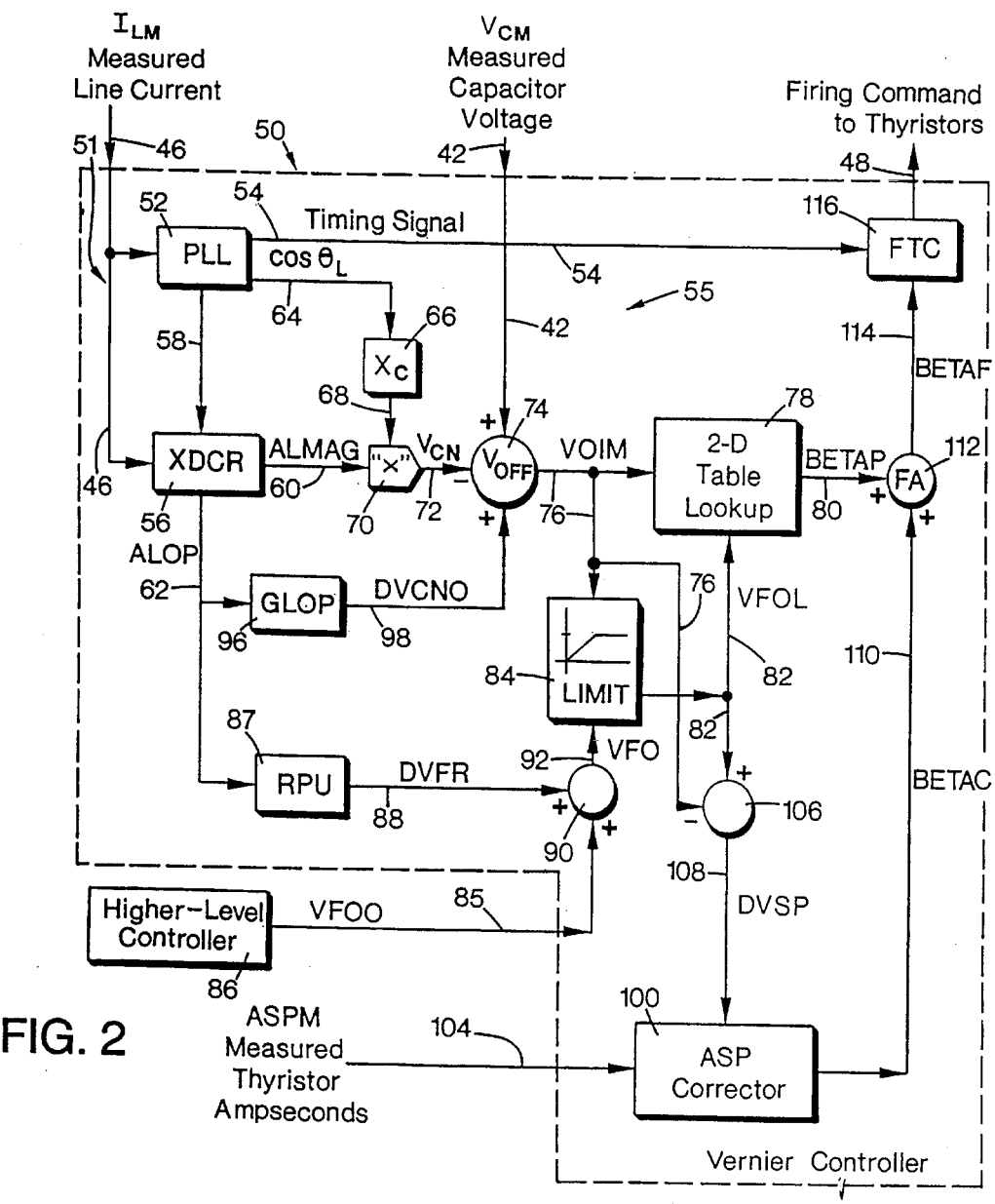
FIG. 2 is a block diagram of one form of a vernier controller of the present invention for controlling the TCSC system of FIG. 1.

The module 25 of the TCSC system 20 includes control means, such as a vernier controller 50, illustrated in FIG. 2. The controller 50 has firing prediction means, such as a firing predictor 51, for receiving the measured line current $I_{LM}$ signal 46, the measured capacitor voltage $V_{CM}$ signal 42, and other signals as described further below, and for predicting therefrom an upcoming firing time at which the firing pulse signal 48 is provided by the controller 50 to the thyristor switch 35. From the description herein, it is apparent that the vernier controller 50 may be implemented primarily in hardware, primarily in software, or various equivalent combinations of hardware and software known by those skilled in the art.

Referring again to FIG. 2, the controller 50 is illustrated as a primarily microprocessor based software implementation. The controller 50 has synchronizing means which may comprise a synchronizer or phase locked loop means, such as a phase-locked loop device (PLL) 52. The PLL 52 uses the monitored line current $I_{LM}$ signal 46 to create a first timing reference signal 54 which is in synchronism with the line current $I_L$. The PLL 52 may be implemented in a variety of structurally equivalent hardware and software forms known by those skilled in the art.

The firing predictor 51 includes TCSC parameter prediction means, such as a TCSC parameter predictor, for predicting the value of an upcoming variable or parameter of interest for the power flowing through the TCSC system 20. In the illustrated embodiment, the TCSC parameter prediction means comprises capacitor voltage predicting means, such as a capacitor voltage ($V_C$) predictor 55, for predicting the value of an upcoming initial capacitor offset voltage (VOIM) from the measured line current $I_{LM}$ and the measured capacitor voltage $V_{CM}$. The $V_C$ predictor 55 includes transduction means, such as a transduction device devised or programmed to perform a transduction method or routine (XDCR) 56. The XDCR 56 receives the $I_{LM}$ signal 46 and a second timing signal 58 generated by the PLL 52. In the illustrated embodiment, the second timing signal 58 is the same as signal 54, although in some applications it may be advantageous to have different values for timing signals 54 and 58. From the timing signal 58 and the $I_{LM}$ signal 46, the XDCR 56 determines the magnitude of the transduced line current (ALMAG) and provides a corresponding transduced line current magnitude signal 60. The XDCR 56 also determines an offset component of the line current (ALOP), and provides a corresponding measured line current offset component signal 62. The XDCR 56 may be implemented in a variety of structurally equivalent hardware and software forms known by those skilled in the art.

A further portion of the $V_C$ predictor 55 is provided by a portion of the PLL 52 which determines a sinusoidal $\cos \phi_L$ function and provides a corresponding $\cos \phi_L$ signal 64 in response thereto. The $\cos \phi_L$ function represents an instantaneous point on the line current $I_L$ waveform corresponding to the timing signal 54. The angle $\phi_L$ represents the angle of the AC line current $I_L$ being predicted or estimated when the timing signal 54 is emitted from the PLL 52. The known value of the capacitive reactance $X_C$ of capacitor 30 is multiplied by the $\cos \phi_L$ function signal 64 by factoring means, such as a capacitive reactance factoring routine or device, illustrated as an $X_C$ gain block 66, to provide a factored $\cos \phi_L$ function ($X_C \cos \phi_L$) signal 68.

The $V_C$ predictor 55 also has multiplication means, such as a multiplication routine, shown as a multiplication function block 70. The multiplication function block 70 receives and multiplies together the ALMAG signal 60 and the ($X_C \cos \phi_L$) signal 68 to provide a predicted value of the normal capacitor voltage $V_{CN}$. The predicted normal capacitor voltage $V_{CN}$ is the capacitor voltage which is expected without any firing of the thyristor valve 35. For example, during steady state conditions, with the ALMAG signal 60 and the capacitive reactance $X_C$ each at a constant value, $V_{CN}$ is a sinusoidal waveform. The multiplier block 70 provides a $V_{CN}$ signal 72 corresponding to this predicted $V_{CN}$ value.

The portion of the $V_C$ predictor 55 thus far described, may be referred to collectively as normal capacitor voltage determining device for determining $V_{CN}$ from the monitored line current $I_{LM}$.

The $V_C$ predictor 55 also has comparing means, such as a voltage offset $V_{OFF}$ comparator 74. The $V_{OFF}$ comparator 74 determines an offset voltage component $V_{OFF}$ of the capacitor voltage $V_C$ from the difference between the measured capacitor voltage $V_{CM}$ signal 42 and the predicted normal capacitor voltage $V_{CN}$ signal 72. The comparator 74 expresses this difference by producing a measured initial offset (VOIM) signal 76, which is also the output of $V_C$ predictor 55.

Thus, the $V_C$ predictor 55 predicts the initial capacitor offset voltage VOIM from the monitored line current $I_{LM}$ received from the current sensor 44, and from the monitored capacitor voltage $V_{CM}$ received from the voltage sensor 40. The illustrated $V_C$ predictor 55 includes the portion of the PLL 52 which provides the $\cos \phi_L$ signal 64 and the timing signal 58, the $X_C$ gain block 66, multiplier block 70, the XDCR 56, and the $V_{OFF}$ comparator 74.

By knowing this offset voltage component $V_{OFF}$ before firing the thyristor valve 35, the required firing angle may be directly determined so the desired capacitor voltage offset $V_{OFF}$ is obtained at the end of the resulting pulse of thyristor current $I_T$ flowing through the thyristor valve 35. The firing angle to provide the desired voltage offset is easily obtained knowing the physical parameters of the TCSC system circuit, which are primarily the capacitance of the capacitor 30, and the inductance L of inductor 34. To accomplish this, the firing predictor 51 has data storage or memory look-up means, such as a 2-D table look-up table circuit or a programmable data storage device 78. The relationship between these parameters may be precalculated and preprogrammed into look-up circuit or program 78. The look-up circuit or program 78 may be a programmed array, registers, latches or other structurally equivalent data storage and retrieval programs and devices known by those skilled in the art. The look-up circuit or program 78 determines a predicted firing angle and provides a predicted firing angle (BETAP) signal 80 from the VOIM signal 76 and a desired final offset (VFOL) signal 82 corresponding to a desired final capacitor voltage offset value VFOL.

This portion of the vernier controller 50 represents a predictive aspect of the controller which advantageously enhances the performance of this system over the earlier systems. This phase controlled thyristor firing scheme, where the thyristor valve 35 is fired at a predicted upcoming time after a normal zero-crossing firing time, advantageously provides vernier control of the TCSC system 20. Vernier operation refers adjusting and controlling the capacitor voltage $V_C$ in a continuous manner over the entire voltage waveform.

The firing predictor 51 has limiting means, such as a limiter 84, for limiting VFOL signal 82 to limit the maximum duty of the thyristors 36. The limited VFOL signal 82 is based on the difference between the VOIM signal 76 and a final offset ordered (VFOO) or command signal 85. The VFOO command signal 85 corresponds to an ordered offset for the capacitor voltage $V_C$ which may be generated by a higher-level controller 86. The higher-level controller 86 may be provided, for example, by a system dispatcher of the power system 22 to obtain a desired voltage drop across the TCSC system 20. Another example of the higher-level controller 86 is a load control device (not shown) for industrial applications to control the manner in which load 26 appears to the power system 22.

Optionally, the VFOO command signal 85 may be modified to enhance the performance of the TCSC system 20 by providing a resistive component behavior for the TCSC system 20 as seen by the transmission line 24 and power system 22. To accomplish this enhancement, the illustrated controller 50 has resistive modeling modulator means, such as a resistive effect (RPU) modulator 87, for modulating the VFOO command signal 85 upon receipt from the higher-level controller 86. In essence, the resistive effect modulator 87 modulates the VFOO command signal 85 in a manner which causes the overall reaction of the TCSC system 20 to resemble a resistor in the transmission line 24.

The RPU modulator 87 receives the ALOP signal 62 and multiplies signal 62 by an RPU gain value which represents the magnitude of the desired resistive effect. In this manner, the resistive effect modulator 87 provides a modulating voltage (DVFR) signal 88. The VFOO command signal 85 and the DVFR signal 88 are added together by summing means, such as a summer circuit or routine 90, to produce a final offset voltage (VFO) signal 92. It is apparent that without the optional DVFR signal 88, the final offset voltage VFO signal 92 would correspond to the ordered final offset voltage VFOO signal 85.

The illustrated limiter 84 limits the VFOL signal 82 to a maximum limit based on the difference between the initial VOIM signal 76 and the final VFO signal 92. This limiting function advantageously provides a desired direct control of the duty imposed on the thyristors 36a and 36b. The thyristor duty is limited because the ampseconds ASP value of a pulse of the thyristor current $I_T$ is directly related to the change in the capacitor voltage $V_C$ over the duration of the pulse. It is apparent that other types of limiting functions may be implemented in particular applications to limit the thyristor duty.

Optionally, the vernier controller 50 may have intra-cycle voltage prediction enhancing means, such as a voltage prediction enhancer (GLOP) 96, for enhancing the prediction of the initial capacitor offset voltage VOIM to predict the value of VOIM at a predetermined intra-cycle time during the thyristor current pulse. The GLOP 96 receives the ALOP signal 62 and multiplies it by a GLOP gain value. The GLOP 96 output is a desired or predicted capacitor voltage (DVCNO) signal 98 which predicts an inter-cycle value for $V_{OFF}$, such as when the thyristor current $I_T$ pulse is a certain way through a cycle, for instance, half way through the cycle. The DVCNO signal 98 is added to the $V_{CN}$ signal 72 and the $V_{CM}$ signal 42 by the $V_{OFF}$ comparator 74. This is possible since the offset component of the current ALOP translates to a change in the offset component of capacitor voltage $V_{OFF}$ over time.

The functions of the vernier controller 50 described above encompass a predictive control for the TCSC system 20 which provides the desired system security. This desired security refers to the prompt response of the actual capacitor voltage $V_C$ to the VFOO command signal 85. This security also refers to the ability of the TCSC system to precisely control the duty on the thyristors 36 to minimize damage to the thyristors. This thyristor duty control is provided by the limiter 84 in the illustrated embodiment. Operational security of the TCSC system 20 is also provided because the voltage $V_C$ across the series capacitor 30 does not drift away from a desired setting due to disturbances in the line current $I_L$ flowing through the TCSC system.

To enhance the long term accuracy for the TCSC system 20, the controller 50 has optional correcting means, such as a thyristor ampseconds (ASP) corrector 100, for correcting the predicted firing angle BETAP 80. The ASP corrector 100 provides a feedback path for the actual ampseconds experienced by the thyristors 36a and 36b. This ampsecond value is measured by thyristor monitoring or sensor means, such as a thyristor ampsecond or ASP monitor 102, for monitoring an ampsecond value of the thyristor current $I_T$ pulse flowing through the commutating circuit 32. The ASP monitor 102 may comprise an ammeter for measuring and integrating the thyristor current $I_T$ to determine a value of the ampseconds and provide a corresponding measured thyristor ampsecond (ASPM) signal 104.

The controller 50 has comparing means, such as a comparator 106, for determining a predicted voltage change (DVSP) signal 108 by subtracting the initial VOIM signal 76 from the final VFOL signal 82. The DVSP signal 108 is supplied to the ASP corrector 100. The ASP corrector 100 compares the ASPM signal 104 with the DVSP signal 108 to establish an error signal within the ASP corrector. The ASP corrector integrates this error signal to provide an output of a corrector firing angle (BETAC) signal 110. The controller 50 has summing means, such as a firing angle summer circuit or routine 112, which adds the corrector BETAC signal 110 to the predicted firing angle BETAP signal 80 to obtain a final firing angle command (BETAF) signal 114.

The controller 50 has firing timing means, such as a firing time computer (FTC) 116, for generating the firing command 48 at the upcoming time predicted by the firing predictor 51. The FTC 116 translates the final BETAF signal 114 into the firing pulse signal 48 at the appropriate times in response to the timing signal 54 received from the PLL 52. Upon receiving the firing command 48, the thyristor valve 35 fires to enter a conducting state from a nonconducting state so pulses of thyristor current $I_T$ can flow through the commutating circuit 32.

Modular TCSC System Embodiment

Figure 3:
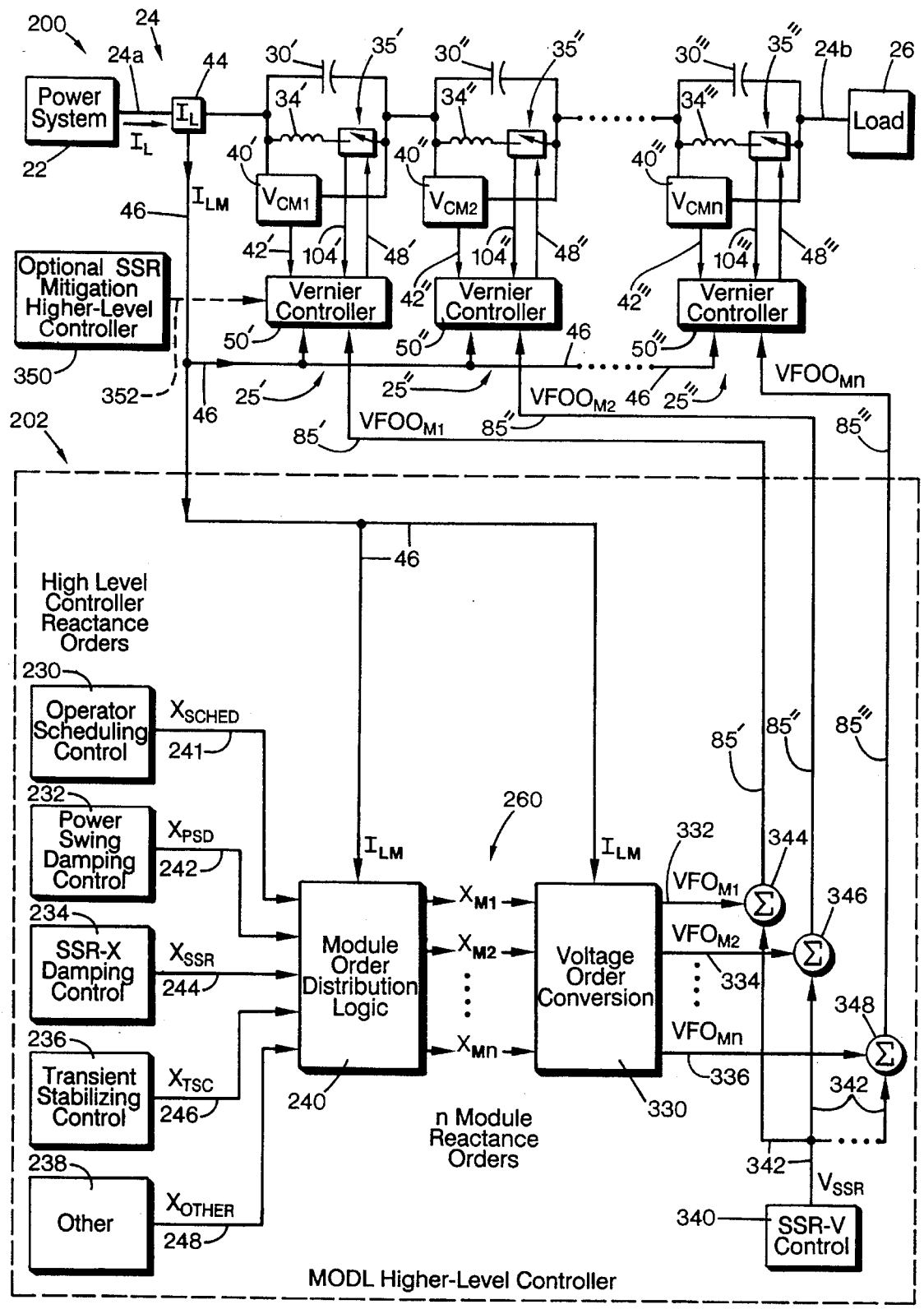
FIG. 3 is a single line schematic block diagram of one form of a multi-module TCSC system with an MODL higher-level controller of the present invention.

FIG. 3 illustrates an embodiment of a modular or multi-module thyristor controlled series capacitor (TCSC) system 200 constructed in accordance with the present invention. The illustrated multi-module TCSC system 200 has plural modules preferably coupled in series, such as a first module 25', a second module 25" and more modules if needed, up to a last nth module 25'''. The capability to add additional modules is shown by the dotted lines separating the second module 25" and the last module 25'''. Each of the modules 25', 25" and 25''' may be constructed as described for module 25 in FIG. 1, with item numbers assigned to components in each module sharing the same prime designator as the module, and variables including the appropriate "Mn" subscript.

For example, the first module 25' has a $C_{M1}$ capacitor 30' in series with the transmission line 24. The first module 25' has a commutating circuit 32' with an inductor 34' in parallel with capacitor 30' to selectively bypass capacitor 30' upon operation of thyristor valve 35'. For simplicity, the thyristor valve 35' has been illustrated in FIG. 3 as a switch. Each thyristor valve 35', 35", 35''' is understood to be in series with a thyristor ampsecond (ASP) monitor (omitted for clarity), which may be as described above for the ASP monitor 102 in FIG. 1. The inclusion of the ASP monitor in valve units 35', 35" and 35''' is apparent from the ASPM output signals 104', 104" and 104''', respectively. Each module also includes a voltage monitor or sensor, such as a $V_{CM1}$ voltmeter 40' for the first module 25', which monitors the voltage across capacitor 30'. The sensor 40' produces a measured capacitor voltage signal 42'.

The multi-modular TCSC system 200 includes a vernier controller for each module 25', 25" and 25''', such as the respective vernier controllers 50', 50" and 50'''. Each vernier controller receives inputs of the measured capacitor voltage signal and the ASPM signal. For example, the vernier controller 50' receives signal 42' from sensor 40', and an $ASPM_{M1}$ output signal 104' from an ASP monitor (not shown) within valve unit 35'. Each of the vernier controllers 50', 50" and 50''' receives an $I_{LM}$ measured line current signal 46 from line current sensor 44 in the same manner as described above for FIG. 1. From these inputs, each vernier controller 50', 50" and 50''' provides a firing command or firing pulse signal to the associated thyristor valve in the same manner as described above for the vernier controller 50 of FIG. 1. For example, the vernier controller 50' provides a firing command signal 48' to the thyristor valve 35'.

To coordinate firing of the thyristor valves 35', 35" and 35''' for designating which capacitor(s) 30', 30" or 30''' are inserted in series with line 24, and when, the modular TCSC system 200 may include a modular order distribution logic (MODL) higher-level controller 202. The effect of adding subsequent modules is to provide a smoother control of the reactance added to transmission line 24. Moreover, performance is improved for applications requiring secure damping of power swings or power flow regulation on adjacent transmission lines (not shown). Selectively adding and removing selected modules may also be used to control operation of the TCSC system 200 in an overload condition, in accordance with the present invention.

Minimum and Maximum Vernier Distribution Control Schemes

The timing chosen for insertion of the capacitors 30', 30" and 30''' of the first, second and last modules with respect to one another defines the degree of vernier control applied to by the modular system 200. While various degrees of vernier control may be implemented, two particular examples are minimum and maximum vernier control. In minimum vernier distribution control, new modules are added as soon as possible, even if the capability of units already inserted is not fully utilized. Using maximum vernier control logic, all of the vernier capability of one module is used before another module is added. In both distribution schemes, the distribution logic of the MODL controller 202 compares the selected compensation order with established thresholds for adding modules or removing modules, as discussed further below with respect to FIGS. 4, 5A and 5B.

The thresholds for adding or removing modules are a function of the number of modules having capacitors coupled in series with the line 24, the module size or rating, the maximum vernier capability, the hysteresis characteristic of the modules. The bypass impedance refers to the impedance of a module when it is bypassed, such as when valve 35' conducts to divert the line current through inductor 34', rather than through capacitor 30'.

The MODL controller 202 will add, by allowing current to flow through capacitor 30' for instance, modules when a desired compensation order exceeds an upper threshold value for that module. When the selected compensation order falls below a lower threshold value for a module, the module will be bypassed by triggering the valve 35', for instance, to conduct. When the selected compensation order is between the upper and lower thresholds, the existing level of compensation is maintained and the thyristor valve 35' will continue in the same conducting or nonconducting state.

Operation of the MODL Higher-Level Controller

Referring to FIG. 3, the MODL higher-level controller 202 provides first, second, and nth final offset ordered ($VFOO_{M1}$, $VFOO_{M2}$ and $VFOO_{Mn}$) or command signals 85', 85" and 85''' to the respective vernier controllers 50', 50" and 50'''. The controllers 50', 50", 50''' may process the command signals 85', 85", 85''' in the same manner as described above for the operation of the vernier controller 50 with respect to signal 85 to generate the firing command signals 48', 48", 48''', respectively. The change in reactance of the inserted modules when a module is added or removed, is provided by MODL controller 202. For instance, the controller 202 varies the $VFOO_{M1}$ signal 85' to change the firing angle of the thyristor valve 35' in response to insertion or removal of modules 25" or 25'''.

The MODL controller 202 receives high level controller reactance orders from various controllers having often competing requirements for the power flow along the transmission line 24. These controllers may be implemented as control routines or devices, in software, hardware or combinations thereof as known to those skilled in the art, and thus, are referred to herein collectively as control "portions" or "controllers." The control portions may be integral components of the MODL controller 202 as illustrated, or separate devices providing their reactance orders as inputs to the MODL controller 202.

In the following discussion, other components and functions of the MODL controller 202, which may be implemented in software, hardware or combinations thereof known to those skilled in the art to be structurally equivalent, will be referred to herein collectively as "portions" of the controller 202. In one preferred embodiment, the functions of the MODL controller 202 are implemented in software routines.

In the illustrated embodiment, controller 202 receives reactance orders from an operator scheduling control portion 230, a power swing damping control portion 232, a subsynchronous resonance reactance (SSR-X) damping control portion 234, a transient stabilizing control portion 236, and any other control portions, indicated generally as 238. An example of another such control portion 238 is discussed in detail below for controlling operation of an electrical device in its overload region, in accordance with the present invention. The output orders of the control portions 230–238 are supplied to a module order distribution logic or MODL portion 240.

The MODL portion 240 receives: an $X_{SCHED}$ scheduled reactance order signal 241 from the operator scheduling controller 230; an $X_{PSD}$ power swing damping reactance order signal 242 from the power swing damping controller 232; an $X_{SSR}$ subsynchronous resonance reactance order signal 244 from the SSR-X damping controller 234; an $X_{TSC}$ transient stabilizing control reactance order signal 246 from the transient stabilizing controller 236; and an $X_{OTHER}$ reactance order signal 248 from the "other" control portion 238. The MODL portion 240 also receives the measured line current signal 46 from the line current sensor 44. It is apparent that the $X_{SCHED}$ scheduled reactance order signal 241 may be received directly from a system operator, rather than from controller 230. Alternatively, the system operator may provide a separate operator signal (not shown) to the MODL portion 240.

The MODL portion 240 may generate signals to adjust the firing command signals 85', 85" and 85''' to adjust the compensation of line 24 to a selected value. Alternatively, the controller 202 may adjust the line current flow or the power flow to selected values over line 24 by adjusting the line compensation.

Figure 4:
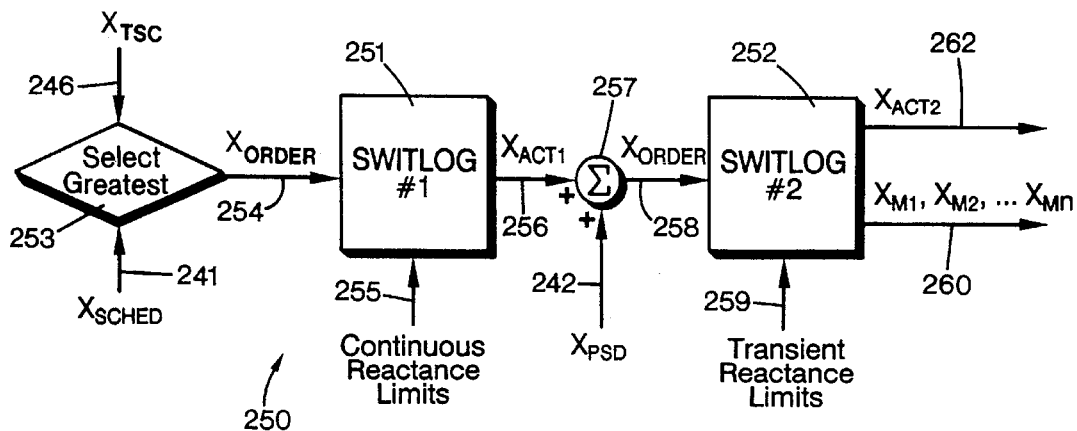
FIG. 4 is a block control diagram of the operation of the MODL higher-level controller of FIG. 3, illustrating a dual stream switching logic approach used to determine when to add or remove a module.

Referring to FIG. 4, an operational diagram 250 of the MODL portion 240 is illustrated. The diagram 250 includes first and second SWITLOG routines 251 and 252, which are illustrated in greater detail below with respect to FIGS. 5A and 5B. The first SWITLOG routine 251 addresses scheduling and transient control needs of controllers 230 and 236. The second SWITLOG routine 252 addresses power swing damping needs of controller 232 to modulate the inserted capacitive reactance in response to power swing disturbances on the line 24.

In a preferred embodiment, the $X_{SSR}$ signal 244 passes from controller 234 directly through the MODL portion 240 and communicates with a dedicated module (not shown), such as module 25', which always remains inserted in series with the line 24. In this manner, continuous SSR damping control is provided to the line 24, independent of the other control requirements. It is apparent that the SSR damping control requirements of controller 234 may be integrated with the requirements of controllers 230, 232, 236 and 238 if more particularly suited for some implementations.

The diagram 250 also has a "select greatest" reactance comparator 253. The comparator 253 receives the $X_{SCHED}$ signal 241 from the operator scheduling controller 230, and the $X_{TSC}$ signal 246 from the transient stabilizing controller 236. The comparator 253 compares signals 241 and 246, selects the signal having the greatest reactance requirements, and issues the selected signal as a first $X_{ORDER}$ signal 254.

The first SWITLOG routine 251 receives the $X_{ORDER}$ signal 254 from the comparator 253. The first SWITLOG portion 251 also receives a continuous reactance limits signal 255, which carries information concerning the continuous reactance limits of the capacitors 30', 30" and 30'". The first SWITLOG device 251 operates as described further below with respect to FIGS. 5A and 5B to provide an $X_{ACT1}$ actual reactance signal 256 to a summing junction 257. The summing junction 257 adds the $X_{ACT1}$ signal 256 to the power swing damping control reactance $X_{PSD}$ signal 242 to provide a second $X_{ORDER}$ signal 258.

The second SWITLOG portion 252 receives the second $X_{ORDER}$ signal 258 from the summing junction 257. A transient reactance limits signal 259 is also supplied to the second SWITLOG portion 252. The transient reactance limits signal 259 carries information concerning the transient operation reactance limits of capacitors 30', 30" and 30'". The second SWITLOG device 252 provides an output comprising a group of n module reactance order signals, indicated generally as 260, representing the reactance orders for each of the modules 25', 25" and 25'". The second SWITLOG portion 252 processes signals 258 and 259 as described further below with respect to FIGS. 5A and 5B to provide an actual reactance $X_{ACT2}$ signal 262. The actual reactance $X_{ACT2}$ signal 262 may be provided, for instance, to a control panel output (not shown) to inform a system operator of the actual reactance ordered.

The $X_{OTHER}$ signal 248 may be combined (not shown) with the control input signals 241 and 246 as a potential input to the first SWITLOG portion 251. Alternatively, the $X_{OTHER}$ signal 248 may be combined (not shown) in a similar manner with the $X_{PSD}$ signal 242 as a potential input to the second SWITLOG portion 252. The exact treatment of the $X_{OTHER}$ signal 248 depends upon what the "other" controller 238 seeks to accomplish. For example, the "other" controller 238 may provide regulation of the line power, the line current, the power angle across the transmission line 24 from the power system 22 to the load 26, etc. In this case, the $X_{OTHER}$ signal 248 may be provided as an input to either the first or the second SWITLOG portions 251 or 252, or neither one, as appropriate for the variable represented.

Figure 5B:
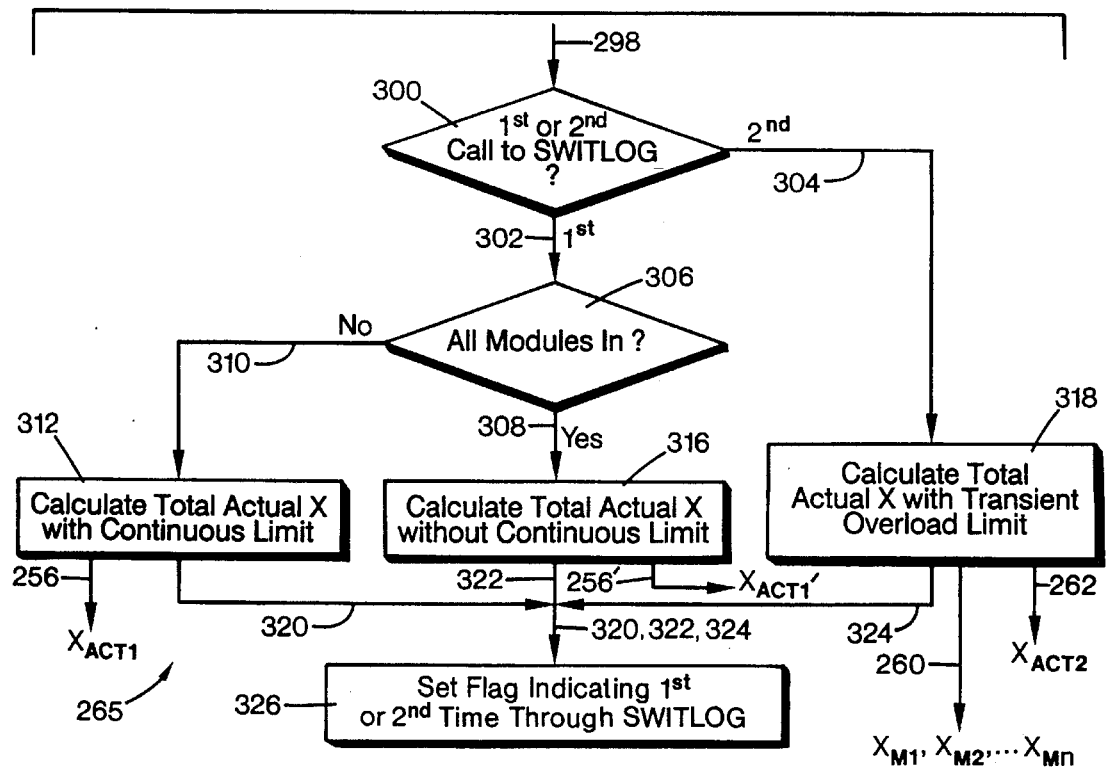
FIGS. 5A and 5B are the respective first and second portions of a flow diagram illustrating one manner of operating the MODL higher-level controller of FIGS. 3 and 4.
Figure 5A:
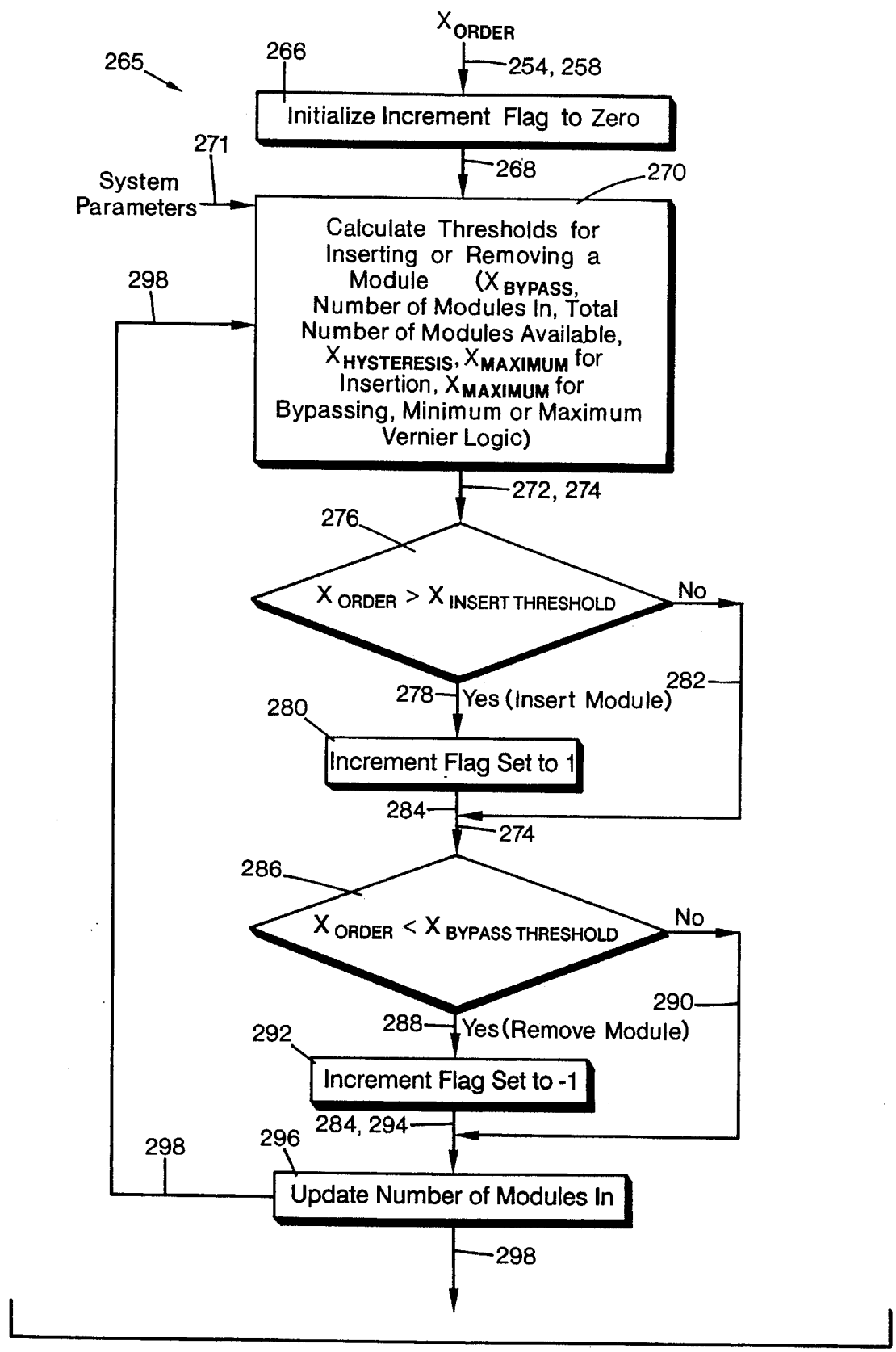

Referring to FIGS. 5A and 5B, a flow diagram 265 illustrates one manner of operating the first and second SWITLOG portions 251 and 252 of the MODL portion 240 to determine when to add or remove a module. The first SWITLOG portion 251 is accomplished by a first pass through the flow diagram 265, and the 252 second SWITLOG portion 252 is accomplished by a subsequent second pass through the flow diagram 265. The first pass 251 is concerned with addressing the continuous operational needs of the system, whereas the second pass 252 is concerned with addressing the short term needs of the system 22. For the first SWITLOG portion 251, the first $X_{ORDER}$ signal 254 is the greater of the $X_{SCHED}$ signal 241 and the $X_{TSC}$ signal 246, as determined by comparator 253. For the second SWITLOG portion 252, on the second pass through the diagram 265, the second $X_{ORDER}$ signal 258 is used as the input to diagram 265. The operation of the SWITLOG portions 251 and 252 will be described generally in terms of $X_{ORDER}$, unless specifically referred to otherwise.

The MODL portion 240 has an initialize increment flag to zero portion 266 which receives the $X_{ORDER}$ signal 254, 258. This flag indicates whether modules will be added or subtracted later, so at the onset of the SWITLOG routine, the flag is reset to zero. The initializing portion 266 provides a reset to zero flag signal 268 to a calculation portion 270. The calculation portion 270 calculates the thresholds for inserting or removing a module using the following variables: $X_{BYPASS}$, the number of modules in series with the line, the total number of modules available, $X_{HYSTERESIS}$, $X_{MAXIMUM\ FOR\ INSERTION}$, $X_{MAXIMUM\ FOR\ BYPASSING}$, and the minimum or maximum vernier logic. The calculation portion 270 also receives a system parameters input signal 271 which represents one or more system parameters, such as line current, line voltage, capacitor voltage and the like.

In general, the switching thresholds for inserting or bypassing a module are functions of the bypass impedance, number of currently inserted modules, total number of available modules, module hysteresis, the maximum reactance limit (either continuous or transient), and system parameters, such as the line current. In addition, the insertion threshold depends upon the choice of minimum or maximum vernier control. Minimum vernier control inserts modules as soon as possible and therefore minimizes losses. Maximum vernier control inserts a module after all of the currently inserted modules reach the vernier limit and therefore maximizes hysteresis.

Referring to FIGS. 5A and 5B, as described above, the calculation portion 270 provides outputs of an $X_{INSERT\ THRESHOLD}$ signal 272, and an $X_{BYPASS\ THRESHOLD}$ signal 274. In an insert comparison portion 276, the $X_{ORDER}$ signal 254, 258 is compared with the $X_{INSERT\ THRESHOLD}$ signal 272. If the $X_{ORDER}$ signal 254, 258 is greater than (>) the $X_{INSERT\ THRESHOLD}$ signal 272, then a YES signal 278 is sent to an increment flag set to one (1) portion 280, and a module is inserted in series with the line 24. Upon receiving the YES signal 278, the increment portion 280 increments the flag set $\phi$ by a value of one (1), to indicate that another module has been added to the line. If the $X_{ORDER}$ signal 254, 258 is less than the $X_{INSERT\ THRESHOLD}$ signal 272, then the comparison portion 276 issues a NO signal 282 which bypasses the increment flag portion 280.

A new flag value signal 284, whether received from the increment flag set portion 280 or the NO signal 282, is delivered to a bypass threshold comparator 286. The bypass threshold comparator 286 also receives a flow through signal of the $X_{BYPASS\ THRESHOLD}$ signal 274 from the calculation portion 270. The bypass threshold comparator portion 286 issues a YES signal 288 if the $X_{ORDER}$ signal 254, 258 is less than the $X_{BYPASS\ THRESHOLD}$ signal 274. If not, the comparator portion 286 issues a NO signal 290. Issuance of the YES signal 288 results in a module being removed from the line 24. To indicate the removal of a module, an increment flag set to negative one (−1) portion 292 receives the YES signal 288 from the comparator 286. In response to the YES signal 288, the increment portion, which could also be referred to as a decrement portion, indicates a decrease in the number of modules by issuing a second new flag set signal 294.

If no modules are inserted, as indicated by NO signal 282, and no modules are removed, as indicated by NO signal 290, the present level of compensation is maintained. An update number of modules inserted portion 296 receives either the new flag signal 294, new flag signal 278, which flows through the diagram, or both NO signals 282 and 290. Signal 278 generates an increase in the number of modules, signal 294 generates a decrease, and the NO signals 282 and 290 indicate no change in status. Accordingly, if required, the module update portion 296 updates the number of modules inserted in series with the transmission line 24, and provides a modules inserted update signal 298 as an input to the calculation portion 270.

The modules inserted update signal 298 carries over from FIG. 5A to FIG. 5B, where it is received by a first or second call to SWITLOG decision portion 300. If this is the first pass 251 through, that is, if the calculations are being performed for the first SWITLOG portion 251, a first pass signal 302 is issued. If this is the second pass 252 through for calculations performed by the second SWITLOG portion 252, a second pass signal 304 is issued.

The first pass signal 302 is received by an all modules in determining portion 306. If indeed all modules 25' through 25''' are inserted in series with the line 24, a YES signal 308 is emitted, and if not, a NO signal 310 is emitted.

If on the first pass 251, and all modules are not yet inserted, the NO signal 310 is received by a first calculate total actual reactance portion 312. The calculation portion 312 calculates the total actual reactance using the continuous reactance limits signal 255. The calculation portion 312 provides an output of the first actual reactance $X_{ACT1}$ signal 256, also shown in FIG. 4.

If on the first pass 251, and all the modules are indeed inserted, the YES signal 308 is received by a second calculate total actual reactance portion 316. Since all the modules are inserted in series with the line, the continuous reactance limits 255 of the capacitors 30', 30'' and 30''' are no longer of concern because it is desirable for the operator to have the ability to use some of the short term overload capability, such as the 30 minute overload capability. Thus, the calculation portion 316 calculates the total actual reactance without using the continuous reactance limits 255, to produce an actual reactance $X_{ACT1}'$ signal 256'.

If on the second pass 252, a calculate total actual reactance portion 318 receives the second pass signal 304. Since during the second pass, the system is concerned with addressing short term disturbances of the power line 24, the calculation portion 318 calculates the total reactance $X_{ACT2}$ signal 262 using the transient overload reactance limits 259, as shown in FIG. 4. The other output of the calculation portion 318 are the n module reactance order signals $X_{M1}$, $X_{M2}$, $X_{Mn}$, referred to collectively as reactance order signals 260 (see FIGS. 3 and 4).

Upon completing their calculations, the calculation portions 312, 316 and 318 emit the respective completed calculation signals 320, 322, and 324. The MODL portion 240 includes a final flag setting portion 326. The flag setting portion 326 sets a flag indicating completion of the first pass 251 through the control scheme 265 upon receipt of signals 320 or 322. The flag setting portion 326 sets a second pass flag upon receiving signal 324, which indicates that the second pass 252 has just been completed.

Referring back to FIG. 3, the $X_{M1}$, $X_{M2}$, and $X_{Mn}$ reactance order signals 260 are received by a voltage order conversion portion 330 of the MODL controller 202. The conversion portion 330 also receives the measured line current signal 46 from the line current sensor 44. Given these inputs, the conversion portion 330 converts the $X_{M1}$, $X_{M2}$ and $X_{Mn}$ reactance order signals 260 into the respective $VFO_{M1}$, $VFO_{M2}$ and $VFO_{Mn}$ final offset voltage signals 332, 334 and 336.

The MODL controller 202 may also have a separate subsynchronous resonance voltage (SSR-V) controller 340 for providing an additional subsynchronous resonance compensation refinement to the final offset voltage signals 332, 334 and 336. The SSR voltage controller 340 may be implemented in a variety of different manners known to those skilled in the art.

For example, one suitable manner of providing vernier control for subsynchronous resonance mitigation is disclosed in U.S. patent application Ser. No. 07/883,474, filed on May 15, 1992, granted as U.S. Pat. No. 5,227,713, with an issue date of Jul. 13, 1993, which is hereby incorporated by reference, particularly for its teachings concerning subsynchronous resonance mitigation in a TCSC system. It is noted that the '713 patent is a continuation-in-part application based partially upon U.S. application Ser. No. 07/806,768, granted U.S. Pat. No. 5,202,583, referenced in the first paragraph of the specification, above, and each of these applications has at least one coinventor in common.

In the illustrated embodiment, the SSR voltage controller 340 provides a $V_{SSR}$ subsynchronous resonance voltage signal 342 to each of three summing junctions 344, 346 and 348. The summing junction 344 combines the $V_{SSR}$ signal 342 with the $VFO_{M1}$ signal 332 to provide the final offset order or command $VFOO_{M1}$ signal 85' to the vernier controller 50'. The summing junction 346 combines the $V_{SSR}$ signal 342 with the $VFO_{M2}$ signal 334 to provide the final offset order or command $VFOO_{M2}$ signal 85'' to the vernier controller 50''. The summing junction 348 combines the $V_{SSR}$ signal 342 with the $VFO_{Mn}$ signal 336 to provide the final offset order or command $VFOO_{Mn}$ signal 85''' to the vernier controller 50'''.

Optionally, separate subsynchronous resonance control other than through the MODL controller 202 may be used to provide continual subsynchronous resonance (SSR) mitigation. For example, the modular system 200 may include an optional SSR mitigation higher level controller 350 which provides a final offset ordered ($VFOO_{SSR}$) or command signal 352 to one or more dedicated modules, for instance, to the vernier controller 50'. The controller 350 may operate as described above for controller 340. If the $VFOO_{SSR}$ signal 352 is supplied to controller 50', then the controller 50' does not receive the $VFOO_{M1}$ signal 85' from the MODL controller 202. The remaining controllers 50'' and 50''' continue to receive their command signals 85'' and 85''' from the MODL controller 202.

Regarding the three types of SSR control provided in the illustrated embodiment, the SSR-X damping controller 234, the SSR-V control portion 340, and the optional SSR controller 350, any one, any two or all three may be used in a given implementation. As is known to those skilled in the art, solving the subsynchronous resonance problem may use a multi-pronged approach. Thus, in some implementations, it may be useful to use all three approaches 234, 340 and 350 to emphasize the positive aspects and minimize the negative aspects.

General Overload Management System

Figure 6:
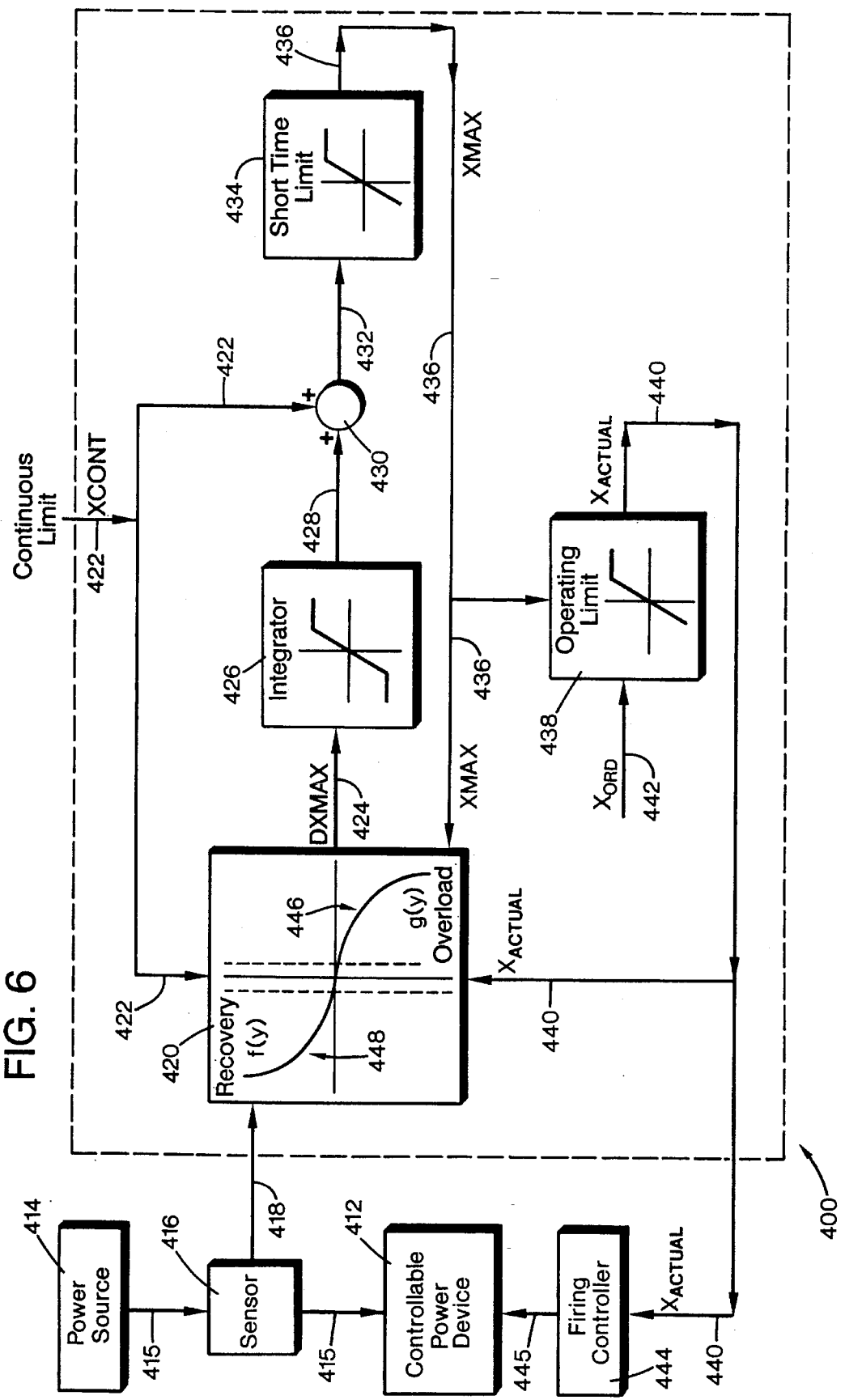
FIG. 6 is a block diagram of one form of an overload management system of the present invention.

FIG. 6 illustrates an embodiment of an overload management system 400 constructed in accordance with the present invention which may be used to operate a controllable electrical device or power device 412. The power device 412 may be any type of equipment which has the ability to manage or govern its own loading, instead of having a loading imposed upon it. Examples of such controllable power devices are high voltage direct current (HVDC) equipment, motor drives, static VAR compensators (SVC), thyristor-controlled series compensation (TCSC) systems, and the like.

The illustrated power device 412 contemplates use of thyristors to govern the load current received by the power device 412. It is apparent that other types of controllable switching devices may be used by the power device 412, such as gate turnoff thyristors (GTOs), metal oxide field effect transistors (MOSFETs), insulated gate bipolar transistors (IGBTs), and the like. The disclosed embodiment of the overload management system 400 is illustrated in general first, and later with respect to a TCSC system, which is the first implementation developed by the inventors.

The power device 412 receives power from a source 414 via a conventional power conductor or line 415. An input parameter sensor 416, such as a conventional line current or voltage sensor, senses a parameter of the power flowing within line 415, and in response thereto, produces a sensor signal 418. The sensor signal 418 is received by a nonlinear function generator portion 420 of the management system 400.

The management system 400 receives a maximum continuous limit (XCONT) signal 422 representative of the maximum continuous limit rating or curve of power device 412. The sensor signal 418 is compared with the XCONT maximum continuous limit signal 422, and with several other signals, by the function generator 420 to produce a resultant generated maximum (DXMAX) signal 424. The DXMAX signal 424 represents a nonlinear function, described further below. The DXMAX signal 424 is then integrated by an integrator portion 426, to produce an integrated signal 428.

A summing portion or summer 430 adds the resultant integrated signal 428 to the XCONT continuous limit signal 422 to provide an adjusted intermediate signal 432. The intermediate signal 432 is received by a short time limiter portion 434. The short term limiter 434 stores the short time overload limits, such as the transient operation limits, of power device 412. Alternatively, the short time limits may be supplied by an external source, such as an operator input (not shown). If the intermediate signal 432 exceeds these short term overload limits, the output of limiter 434 is limited to the maximum overload value to provide a maximum reactance (XMAX) signal 436.

An operating limit limiter portion 438 receives the XMAX signal 436. The limiter 438 uses the XMAX signal 436 to establish a maximum operating limit, which is applied to an incoming order signal to provide an actual reactance order ($X_{ACTUAL}$) signal 440. This incoming order signal may be received from another higher level controller (not shown), it may be received from an operator, or other input system (not shown), and is designated as ordered operating limit ($X_{ORD}$) signal 442. The limiter 438 receives the $X_{ORD}$ signal 442 and limits it to a maximum value established by the XMAX signal 436. Thus, the maximum reactance limit XMAX of limiter 438 may be continually adjusted according to the XMAX signal 436, for example to coordinate with the time-overload characteristics of the power device 4120.

The $X_{ACTUAL}$ signal 440 is received by a switching controller portion selected to send triggering, firing, gating or other appropriate on/off signals as required to control the selected switching device into conducting and nonconducting states. The illustrated switching controller portion is a firing controller 444 for generating thyristor triggering or firing signals 445, assuming that the power device 412 is a thyristor controlled device. The firing controller 444 operates in response to the $X_{ACTUAL}$ signal 440 to determine the sequence and timing of firing the thyristors (not shown) which form a portion of the power device 412. As another example, if the power device 412 includes MOSFETs as switching devices, then the switching controller 444 may generate gate signals as the appropriate on/off signals to control the MOSFETs.

As mentioned above, the nonlinear function generator 420 receives several variables which are used to determine the generated DXMAX signal 424. The illustrated function generator 420 receives the input sensor signal 418, the XCONT continuous limit signal 422, the XMAX maximum reactance limit signal 436, and the $X_{ACTUAL}$ signal 440, which may be limited to the XMAX operating limit established by limiter 438. As shown in FIG. 6, the function generator 420 has three operating regions, specifically, an overload region 446, a recovery region 448, and a normal band of operation from the centerline toward the left, with the area between the two vertical dashed lines representing an optional deadband region.

The overload region 446 of the function generator 420 is defined by the function g(y), which is indicative of operation above the maximum continuous limit (XCONT) of the power device 412. During operation in the overload region 446, the function generator 420 generates a negative value for the DXMAX signal 424. A negative DXMAX signal 424 reduces the operating limit (XMAX) of limiter 438 over time.

The recovery region 448 of the function generator 420 is defined by the function f(y), which is indicative of operation below the maximum continuous limit (XCONT) of device 412. During operation in the recovery region 448, the function generator 420 generates a positive value for the DXMAX signal 424. This positive DXMAX signal 424 increases the operating limit (XMAX) of limiter 438. The character of the nonlinear function of generator 420 depends upon the capability curve of the specific type of equipment serving as power device 412. For example, the nonlinear function of generator 420 may be exponential.

In operation, the overload management system 400 preferably applies control limits to the power device 412 to allow periods of operation in the short term and transient overloads regions, while avoiding significant loss of life for the device 412. The management system 400 operates by comparing an input representative of the operational state of the power device 412, here supplied as a voltage or current sensor signal 418 from sensor 416, to the continuous operating limit of device 412, represented by the XCONT signal 422. This comparing operation is illustrated as being preformed by the function generator 420, which provides a nonlinear function output, here, the DXMAX signal 424.

The DXMAX signal 424 is then integrated by integrator 426, and the resultant signal 428 is added to the XCONT continuous limit signal 422. The sum of these values, signal 432, is limited to a maximum transient value by limiter 434, as illustrated, and the resulting XMAX signal 436 serves as an upper limit for any incoming order. This limiting operation is shown as limiter 438 operating on the $X_{ORD}$ signal, to generate the $X_{ACTUAL}$ signal 440. Thus, a continuous control limit may be applied to the slow, steady-state portion of the control spectrum, whereas, a short-time limit may be applied to the transient portions of the control spectrum. It is apparent that other control limits may also be applied, such as during start-up, shut-down, and any other operational areas of interest.

Vernier TCSC Embodiment of the Overload Management System Controller

Figure 7:
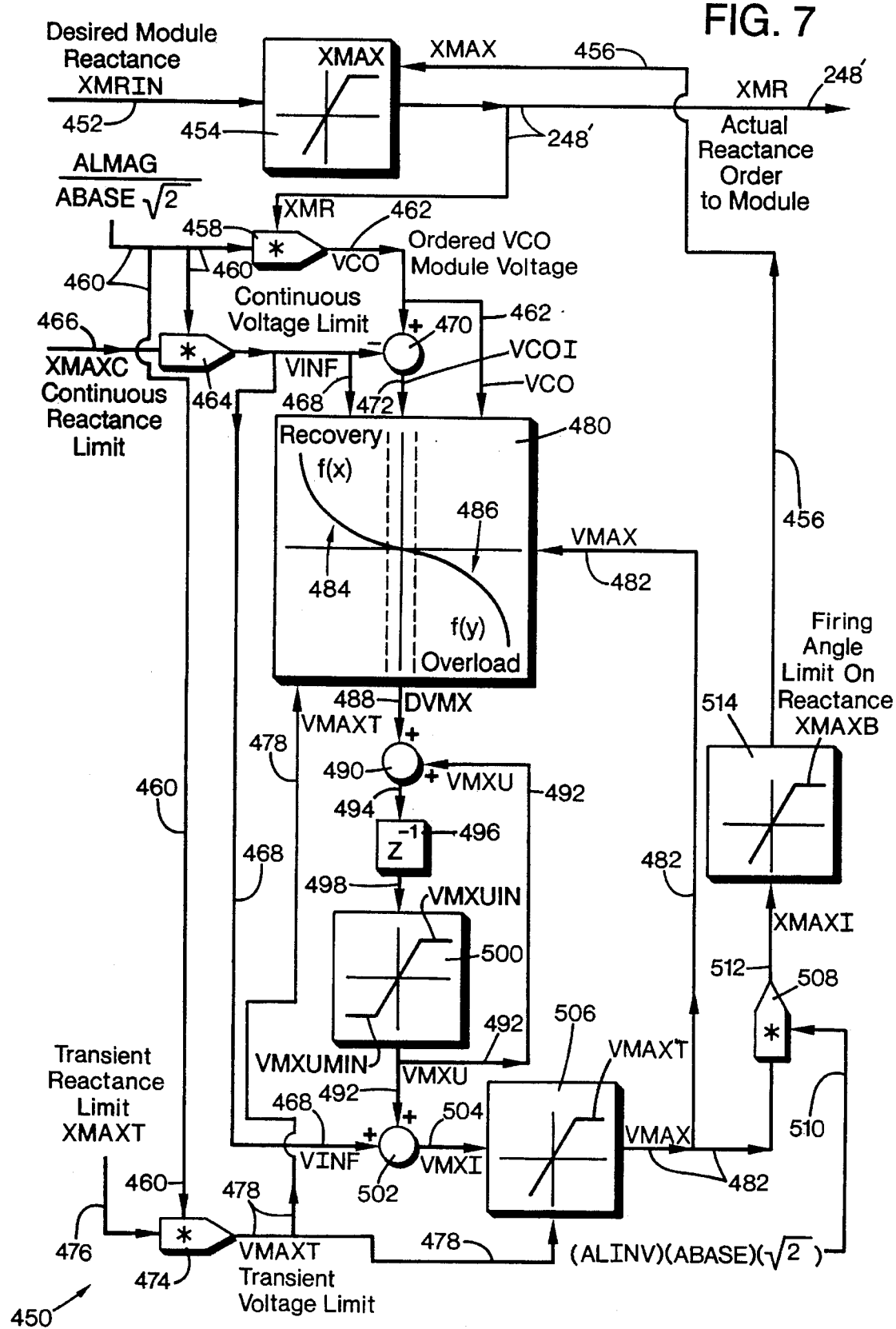
FIG. 7 is a block diagram of an alternate embodiment of an overload management system of the present invention, which may form a portion of the MODL higher-level controller of FIG. 3.

Referring to FIG. 7, an overload management system controller or overload controller 450 constructed in accordance with the present invention is illustrated. The overload controller 450 may serve as the "other" controller 238 of FIG. 3. Corresponding to the $X_{OTHER}$ signal 248, the overload controller 450 produces an output actual reactance order (XMR) signal 248'. The XMR signal 248' is received by the module order distribution logic portion 240 of the MODL higher level controller 202 of FIG. 3, for processing as described above.

The overload controller 450 receives a desired module reactance (XMRIN) signal 452 corresponding to a desired reactance level for the controllable power device, here, the TCSC modules 25', 25" and 25'" for the TCSC system 200 of FIG. 3. A maximum reactance limiter portion 454 receives the XMRIN signal 452 and limits it to a maximum value based on previous loading, current loading demands, and the firing capability of the thyristors 35', 35" and 35'". The maximum reactance limit XMAX of limiter 454 may be continually adjusted according to an input maximum reactance limit (XMAX) signal 456, which is generated as described further below.

The output of limiter 454 is the XMR actual reactance order signal 248', which is also supplied to a first multiplier portion 458. The multiplier 458 receives a per unit current magnitude signal 460, which may be derived from the $I_{LM}$ current magnitude signal 46 in the illustrated embodiment. The per unit current signal 460 is computed by dividing the current magnitude, ALMAG, by the per unit base value and the square root of two, thus, [ALMAG÷((ABASE)($2^{-½}$))]. The multiplier 458 multiplies the per unitized current magnitude signal 460 with the XMR signal 248' to provide an ordered module voltage (VCO) signal 462. That is, by multiplying the reactance and current, multiplier 458 has produced an output signal 462, which representative of a voltage value.

The current magnitude signal 460 is also received by a second multiplier portion 464. The second multiplier 464 also receives a continuous reactance limit (XMAXC) signal 466, indicative of the continuous reactance limit rating of the modules 25', 25" and 25'". The multiplier portion 464 multiplies the current magnitude signal 460 and the XMAXC signal 466 together to provide a continuous voltage limit (VINF) signal 468. Thus, by multiplying the reactance and current, the multiplier 464 has produced an output signal 468, which represented in terms of a voltage. A first comparator portion functions as a subtractor portion 470 to subtract the VINF signal 468 from the VCO signal 462, with the output being an intermediate ordered module voltage (VCOI) signal 472. Thus, subtractor 470 performs the following operation: VCOI=VCO–VINF.

The current magnitude signal 460 is also received by a third multiplier portion 474. The multiplier 474 also receives a transient reactance limit (XMAXT) signal 476, indicative of the transient reactance limits of the modules 25', 25" and 25'". The multiplier portion 474 multiplies the current magnitude signal 460 by the XMAXT signal 476 to provide a representative voltage signal output comprising a maximum transient voltage limit (VMAXT) signal 478.

The overload controller 450 also includes a nonlinear function generator portion 480, which may operate in the same manner as described above for the function generator 420 of FIG. 6. The function generator 480 receives several input signals, including a maximum voltage (VMAX) signal 482, which is generated as described further below. The function generator portion 480 also receives the VCO signal 462, the VCOI signal 472, the VINF signal 468, and the VMAXT signal 478. The function generator 480 processes these inputs according to the nonlinear function having a recovery portion 484, designated as a function, f(x). The function generator 480 also has an overload function portion 486, designated by the function f(y).

For example, the subtractor portion 470 provides the VCOI signal 472, which may be positive or negative depending upon the relative values of the ordered operating point of the TCSC system 200, indicated by the VCO signal 462, and the continuous operation limitations of modules 25', 25" and 25'", represented by the VINF signal 468. Thus, when the VCOI signal 472 has a positive value, indicating ordered operation above the continuous operation limit, the system 200 is then operating in the overload portion 486 of the function generator 480. Conversely, when the VCOI signal 472 is negative, the TCSC system 200 is operating in the recovery portion 484. A normal band of operation is indicated from the centerline toward the left, with the area between the two vertical dashed lines representing an optional deadband region, as shown in FIG. 7 for the function generator 480.

The function generator 480 generates an output (DVMX) signal 488 which is received by a second comparator portion, functioning as summer portion 490. The summer 490 also receives a feedback signal comprising an integrated voltage (VMXU) signal 492, which is generated as described below. The summer 490 adds the DVMX signal 488 and the VMXU signal 492 together to provide a summation signal 494.

The summation signal 494 is received by an integrator portion 496, represented in FIG. 7 as $Z^{-1}$. The integrator 496 integrates the sum of the output signal 488 of the nonlinear function generator 480 and the feedback signal 492 to provide an integrated output signal 498. The integrated output signal 498 is received by a limiter portion 500, which has a maximum limit VMXUIN, and a minimum limit VMXUMIN, as indicated in FIG. 7. The limiter 500 limits the integrated output signal 498 to a value within the maximum and minimum limits (VMXUIN, VMXUMIN), to provide the limited and integrated VMXU signal 492, which serves as a feedback to the summer portion 490.

The VMXU signal 492 is also supplied to a third comparator portion, functioning as a second summer portion 502. The summer 502 also receives the VINF continuous voltage limit signal 468. The summer 502 adds these two signals together to provide an intermediate voltage (VMXI) signal 504. The VMXI signal 504 is received by a maximum transient voltage limiter portion 506. The limiter 506 also receives the VMAXT signal 478, which serves as the maximum transient voltage limit VMAXT. The limiter 506 limits the VMXI signal 504 to the maximum value VMAXT to provide the VMAX maximum voltage output signal 482. As mentioned above, the VMAX signal 482 is supplied as an input to the nonlinear function generator portion 480.

Supplying the VMAXT signal 478 to the limiter portion 506 allows for adjustment of the maximum transient voltage limit over time, if desired, by changing the input value of the XMAXT signal 476. Similar adjustments may be made to the continuous voltage limit by varying the XMAXC signal as desired. Such adjustment is useful to accommodate replacement components installed in the modules 25', 25" or 25'". During operation, it is apparent that the transient voltage limit VMAXT, as well as the continuous voltage limit VINF, vary in response to the changing line current magnitude, as represented by the signal 460, by virtue of the function of multipliers 464 and 474.

To convert the VMAX maximum voltage output signal 482 back into a reactance signal, the overload controller 450 includes a fourth multiplier portion 508. The multiplier 508 receives a current measure signal 510 which is the inverse of the perunitizing function applied to obtain the per unit input current magnitude signal 460. The signal 510 is indicated in FIG. 7 as the product of the inverse of the line current magnitude, ALINV, the per unit base value, ABASE, and the square root of two, thus, $[(ALINV)(ABASE)(2^{-\frac{1}{2}})]$. The multiplier 508 multiplies signal 510 and the VMAX signal 482 together to provide an intermediate maximum reactance (XMAXI) output signal 512.

The XMAXI signal 512 is received by a firing angle limit on reactance limiter portion 514. The limiter 514 has a maximum reactance limit XMAXB, which is the maximum reactance limit based on the firing capability of the thyristors 35', 35" and 35'". The output of limiter 514 is the XMAX signal 456. The XMAX signal 456 is supplied as an input to the maximum reactance limiter 454, as mentioned above.

In operation, the overload controller 450 converts the module reactance order, indicated by the XMR signal 248', and the per unit line current magnitude, indicated by signal 460, into an actual voltage ordered to the module, indicated by the VCO signal 462. The ordered module voltage (VCO signal 462) is compared by subtractor 470 to the continuous maximum voltage limit, indicated by the VINF signal 468. The result of this comparison is the intermediate VCOI signal 472, which is supplied to the nonlinear function generator portion 480.

The f(x) recovery region 484, the f(y) overload region 484, and the normal or transition region therebetween (defined by the vertical dashed lines in FIG. 7) depend upon the characteristics of the modules 25', 25" and 25'", such as the loading characteristics set forth in various industry standards, as known to those skilled in the art. For example, the illustrated nonlinear function used by the function generator 480 in the illustrated TCSC overload management system 450 is based on the loss-of-life relationship described by an IEEE standard on series capacitors, specifically, IEEE Standard No. 824-1985, dated Nov. 25, 1985. This standard provides guidelines on the relationship between overload level, duration, and loss-of-life per event, such as per each instance of overload operation or transient event. Based on this industry standard, the resulting nonlinear function in FIG. 7 within the function generator 480 is exponential in nature.

These loading characteristics depend upon the construction of the power device components, such as their insulation design and heat dissipation characteristics under various loadings. Over time, insulation degrades, with the rate of degradation increasing with increases in heat, such as heat caused by the $I^2R$ losses of the load current flowing through the device. Thus, power devices are designed with a certain useful life in mind, dependent upon the anticipated loading of the device. By controlling short term and transient overloading during operation using the overload management system 400, 450, the designed overload operational range of the power equipment may be more efficiently used, without imposing a significant loss of life on the power equipment.

The output of the function generator 480 is integrated by integrator 496, which then is maintained within maximum and minimum limits VMXUIN and VMXUMIN by limiter 500, with a feedback signal 492 being supplied to the function generator output. The result of integrating the nonlinear function (VMXU signal 492) is then added back onto the continuous voltage limit (VINF signal 468) by the summer 502. The VMXI intermediate voltage signal 504 is then limited to a maximum transient voltage value (VMAXT) by limiter 506, after which it is multiplied by the inverse of the line current signal with perunitizing removed (as indicated by signal 510) by multiplier 508. The result is the XMAXI intermediate maximum reactance signal 512, which is then limited by limiter 514 to accommodate the firing angle limitations of the thyristors 35', 35" and 35'", to establish the maximum value for limiter 454, as indicated by the XMAX signal 456.

Performance of the Overload Management System Controller in a TCSC Embodiment

The vernier control strategy of the present invention has the ability to amplify the current through the capacitor by allowing partial thyristor conduction, which adds a new dimension to the overload capability issue beyond that associated with conventional series capacitors. The overload management system 450 advantageously protects the module components to prevent equipment damage from such thyristor conduction. Moreover, the system 450 advantageously permits use of the inherent overload capability of the modules, while preventing protective bypass.

In principle, the vernier control strategy, including overload management system 450, constrains operation to the region of the capability curves of the modules 25', 25" and 25'". In the illustrated embodiment, this implies a voltage limit over most of the range, imposed as a reactance order limit which is inversely proportional to line current.

The control limits consist of a continuous limit applied to the slow, steady-state portion of the control spectrum, and a short-time limit applied to the transient portions of the control spectrum. It is apparent that other limits may be applied as required by various other implementations. The short-time limit may be gradually reduced over time to coordinate with the time-overload characteristics of the protection functions.

At high line current, typically the TCSC must bypass to protect itself. The control action may include hysteresis compensation to accommodate the decrease in the line current due to loss of series compensation when the TCSC is bypassed. Preferably, such hysteresis is set higher than the net reduction in line current due to bypassing.

With a multi-module TCSC, a smoother vernier control option is available. For instance, bypassing the first module 25' may reduce the line current enough to allow the remaining modules 25" and 25'" to remain inserted. In essence, the upper limit can become a current-regulating mode, which will remove only those modules needed to reduce current to a safe level for the remaining modules.

Referring to FIGS. 8-11, the various signal levels of a computer test conducted on an overload management system, modeled as shown for the overload controller 450 of FIG. 7, are illustrated. This computer model simulation was conducted under transient limit operating conditions with a ten second transient limit. The other values assigned in the simulation were: a line current of 1 pu; a module compensation order of 2 pu; a maximum continuous voltage limit of 1.15 pu; and a transient voltage limit of 1.9 pu.

Figure 8:
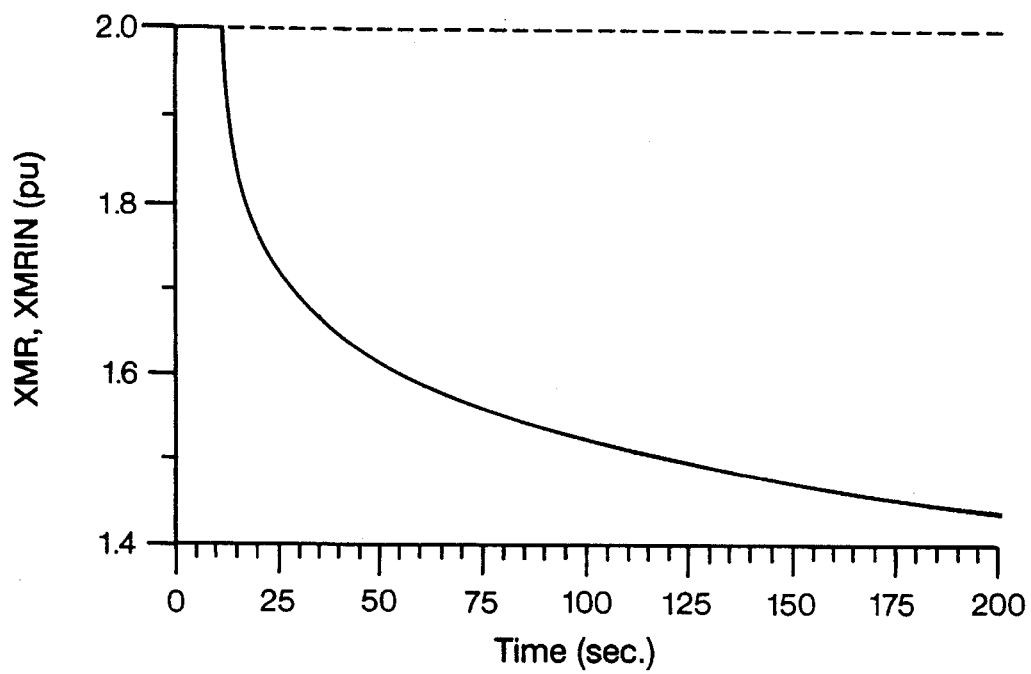
FIGS. 8–11 are each graphs of the various signals illustrated in FIG. 7 under transient limit (here, ten seconds) overload operating conditions.
Figure 9:
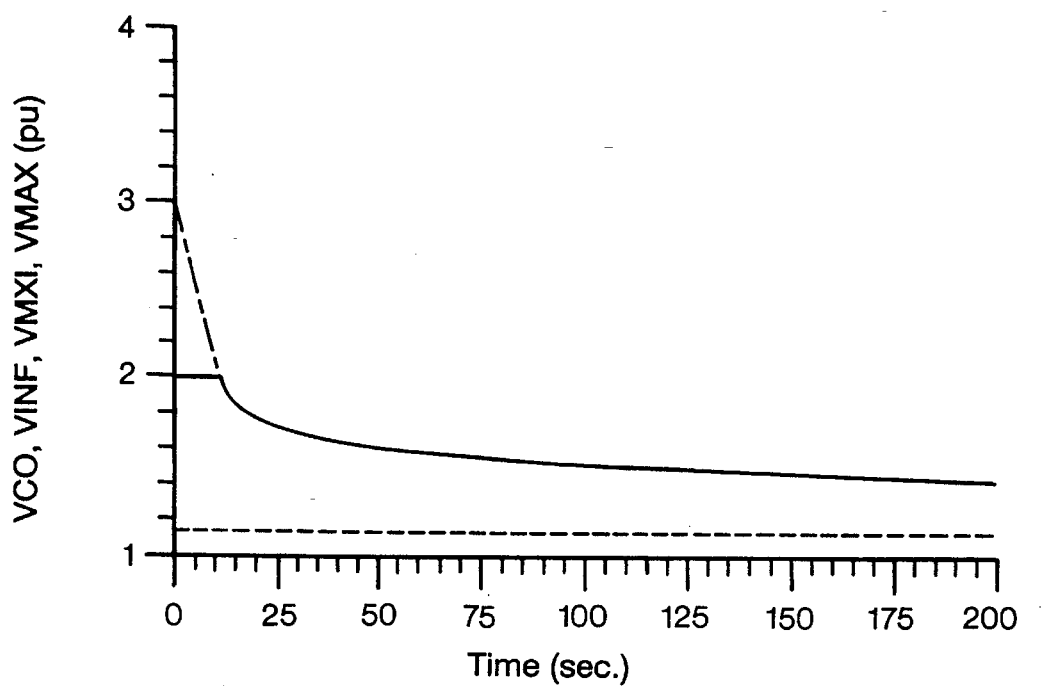

FIG. 8 illustrates the XMRIN desired module reactance signal 452, and the XMR actual reactance order signal 248'. FIG. 9 illustrates the VCO ordered module voltage signal 462, the VINF continuous voltage limit signal 468, the VMXI intermediate voltage signal 504, and the VMAX maximum voltage signal 482.

In this example, the module reactance order and the ten-second transient reactance limit (the XMR signal 248' and the XMAXT signal 476, respectively) are identical, as shown in FIG. 8. Therefore, the VCO module voltage order signal 462 is initially at 2 pu and remains there for ten seconds, as indicated by the solid line in FIG. 9. At ten seconds, the VMAX voltage limit signal 482, as indicated by the alternating long and short-dashed line in FIG. 9, has integrated down below the 2 pu limit, which forces the module compensation to a lower value, as indicated by the XMR solid line plot of FIG. 8. With the value of the XMR signal declining, the module voltage signal shown in FIG. 9 also follows this decline, as indicated by the solid line in FIG. 9.

Figure 10:
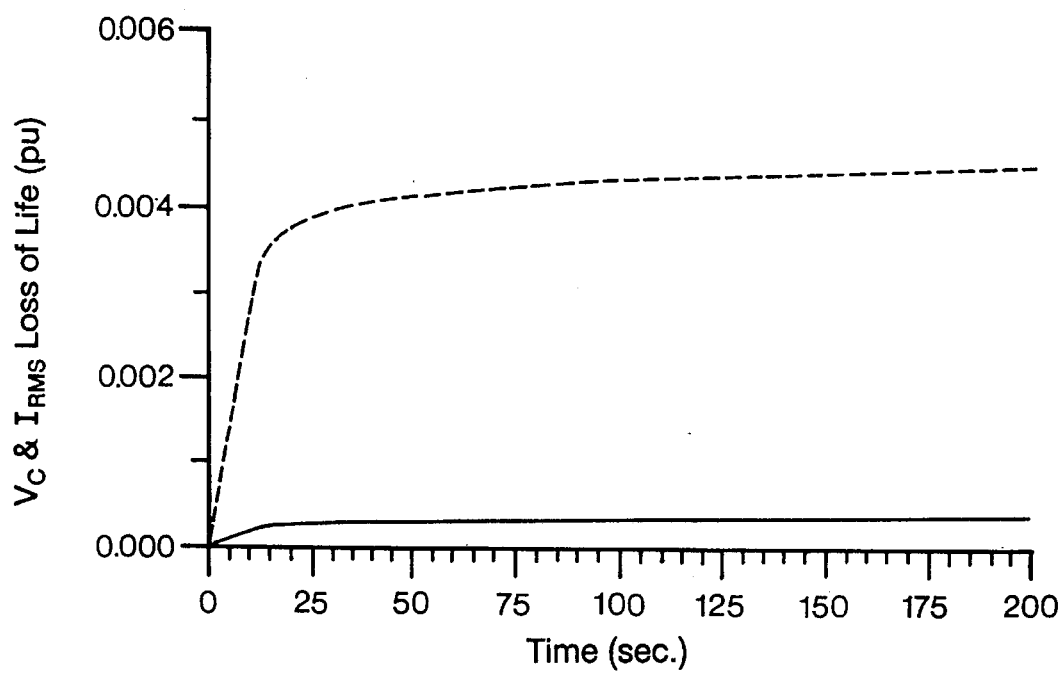
Figure 11:
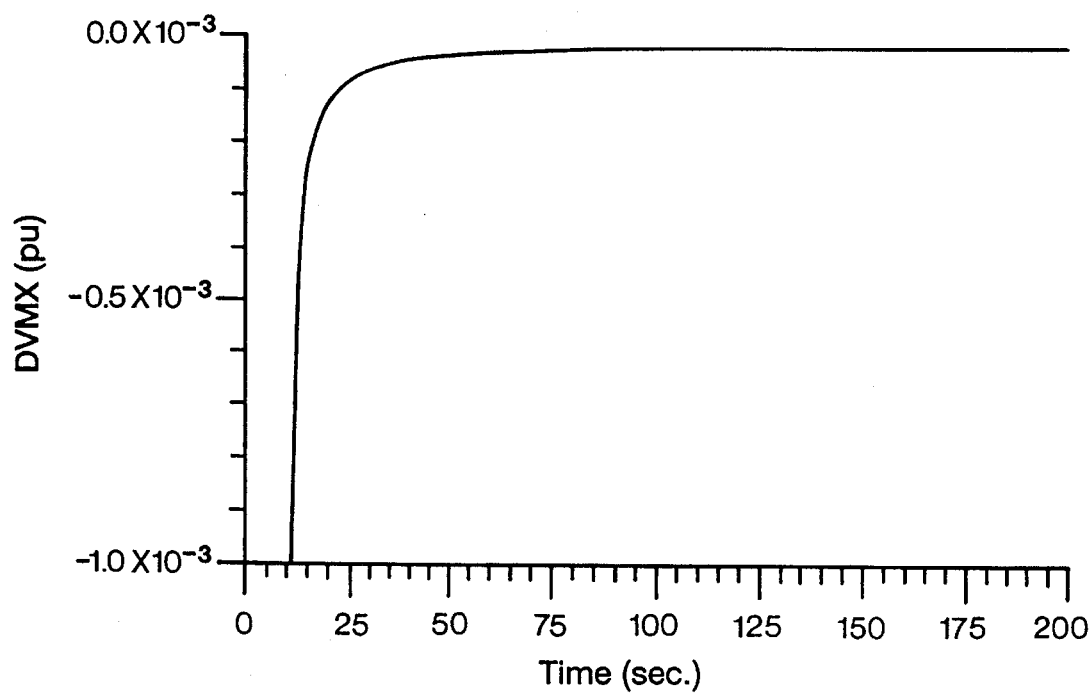

FIG. 10 illustrates the $V_C$ loss-of-life curve for the capacitors 30', 30" and 30'" due to the transient event. FIG. 11 illustrates the DVMX signal 488, which is the output of the nonlinear function generator 480 under test these conditions.

Conclusion

Having illustrated and described the principles of our invention with respect to a preferred embodiment, it should be apparent to those skilled in the art that our invention may be modified in arrangement and detail without departing from such principles. For example, other combinations of hardware and software may be used to implement the functions of the vernier controller 50 and MODL higher-level controller 202 described herein. Furthermore, other types of monitors and signal processors may be used to provide the measured line current $I_{LM}$, the measured capacitor voltage $V_{CM}$, and the measured thyristor ampseconds ASPM to the vernier controller 50. Such structural equivalents for the monitors and the components of the vernier controller 50 and the MODL higher-level controller 202 are known to be interchangeable by those skilled in the art and may be substituted herein.

Moreover, while the MODL higher-level controller 202 has been described for use in the modular TCSC system 200, it is apparent that the MODL controller 202 may be useful for other applications having multiple modules with stepwise and vernier capability. For example, the overload management system control strategy is particularly beneficial for use with equipment having load management capability, including other thyristor-controlled power equipment, HVDC equipment, motor drives, and static VAR compensators. We claim all such modifications falling with the scope and spirit of the following claims.

We claim:

1. An apparatus for managing overload operation of an electrical device in a short-term overload region, said apparatus comprising:

a sensor to obtain an input signal representative of an operational state of said electrical device;

a controller to process said input signal and generate a control signal, said controller characterizing said input signal as operating in an overload region above a maximum continuous limit or in a recovery region below a maximum continuous limit, said control signal providing a short-term limit reduction command when said input signal is in said overload region and a short-term limit increase command when said input signal is in said recovery region; and a switch responsive to said control signal to govern the current received by said electrical device so as to operate said electrical device in a short-term overload region above said maximum continuous limit without incurring significant loss of life in said electrical device.

2. The apparatus of claim 1 wherein said controller further comprises:

a function generator to produce a resultant maximum signal;

an integrator to integrate said resultant maximum signal to produce an integrated signal; and a summing device to add said integrated signal to a maximum continuous limit signal, indicative of the continuous capability region of operation of said electrical device, to produce said control signal.

3. The apparatus of claim 2 wherein said controller further comprises:

a short term limiter to limit said control signal to a maximum short-term overload value, indicative of the short-term overload capability of said electrical device, to provide a maximum reactance signal; and an operating limit limiter to establish a maximum operating limit on an incoming order using said maximum reactance signal to generate an augmented control signal that is applied to said electrical device;

wherein said function generator produces said resultant maximum signal in response to said input signal, said maximum reactance signal, said augmented control signal, and said maximum continuous limit signal.

4. The apparatus of claim 3 wherein said short term limiter stores an overload limit indicative of at least a portion of the short-term overload region of operation of said electrical device.

5. The apparatus of claim 4 wherein said overload limit is adjustable in response to the region of operation of said electrical device.

6. The apparatus of claim 4 wherein said limiter stores a first overload limit and a transient overload limit of a magnitude higher and a duration shorter than said first overload limit.

7. The apparatus of claim 2 wherein said function generator produces said resultant maximum signal based on a selected nonlinear function.

8. The apparatus of claim 7 wherein said function generator uses a selected nonlinear function having three operating regions comprising an overload region, a recovery region, and a normal band of operation region.

9. The apparatus of claim 1 wherein said electrical device is selected from the group including a high-voltage direct current device, a motor drive, a static volt-amperes-reactive compensator, and a thyristor-controlled series compensation system.

10. The apparatus of claim 1 wherein said switch is selected from the group including a gate turnoff thyristor, a metal oxide field effect transistor, and an insulated gate bipolar transistor.

11. A method of managing overload operation of an electrical device in a short-term overload region, said method comprising the steps of:

sensing an input signal representative of an operational state of said electrical device;

generating a control signal from said input signal by characterizing said input signal as operating in an overload region above a maximum continuous limit or in a recovery region below a maximum continuous limit, said control signal providing a short-term limit reduction command when said input signal is in said overload region and a short-term limit increase command when said input signal is in said recovery region; and governing the current received by said electrical device, in response to said control signal, so as to operate said electrical device in a short-term overload region above said maximum continuous limit without incurring significant loss of life in said electrical device.

12. The method of claim 11 wherein said generating step includes the steps of:

producing a resultant maximum signal with a function generator;

integrating said resultant maximum signal to produce an integrated signal; and adding said integrated signal to a maximum continuous limit signal, indicative of the continuous capability region of operation of said electrical device, to produce said control signal.

13. The method of claim 12 further comprising the steps of:

limiting said control signal to a maximum short-term overload value, indicative of the short-term overload capability of said electrical device, to provide a maximum reactance signal; and establishing a maximum operating limit on an incoming order using said maximum reactance signal to generate an augmented control signal that is applied to said electrical device;

wherein said producing step produces said resultant maximum signal using said input signal, said maximum reactance signal, said augmented control signal, and said maximum continuous limit signal.

14. The method of claim 13 wherein said limiting step includes the step of storing a first overload limit and a transient overload limit of a magnitude higher and a duration shorter than said first overload limit.

15. The method of claim 12 wherein said producing step includes the step of producing said resultant maximum signal based on a selected nonlinear function.

16. The method of claim 15 wherein said selected nonlinear function of said producing step has three operating regions comprising an overload region, a recovery region, and a normal band of operation region.

17. The method of claim 11 further comprising the steps of:

supplying said control signal to a vernier controller as an overload order;

supplying at least one other order from at least one higher-level controller to said vernier controller; and adjusting the issuance of said control signal using a vernier adjustment.

18. The method of claim 11 further comprising the steps of:

generating an overload order;

supplying said overload order to a vernier controller;

supplying to said vernier controller a scheduling order from an operator scheduling controller, a power swing damping order from a power swing damping controller, a subsynchronous resonance order from a subsynchronous resonance reactance damping controller, and a transient stabilizing order from a transient stabilizing controller;

balancing the competing needs of said overload order, scheduling order, power swing damping order, subsynchronous resonance order, and transient stabilizing order; and adjusting, in response to said balancing step, the issuance of said control signal using a vernier adjustment.

* * * * *